United States Patent [19]

Stanfield

[11] 4,249,985

[45] Feb. 10, 1981

[54] PRESSURE ROLLER FOR APPARATUS USEFUL IN REPAIRING SPROCKET HOLES ON STRIP MATERIAL

[76] Inventor: James S. Stanfield, P.O. Box 1983, Santa Monica, Calif. 90406

[21] Appl. No.: 17,386

[22] Filed: Mar. 5, 1979

[51] Int. Cl.$^3$ ........................ B32B 31/04; B32B 35/00

[52] U.S. Cl. ........................ 156/554; 156/94; 156/555; 29/132

[58] Field of Search ................. 156/94, 554, 516, 522, 156/555, 209; 29/132

[56] References Cited

U.S. PATENT DOCUMENTS

| | | | |
|---|---|---|---|
| 2,639,519 | 5/1953 | Polk | 29/132 |
| 3,237,433 | 3/1966 | Doleman | 29/132 |
| 3,547,723 | 12/1970 | Gresham | 156/209 |
| 3,786,549 | 1/1974 | Pott | 29/132 |
| 3,959,048 | 5/1976 | Stanfield | 156/94 |
| 4,026,756 | 5/1977 | Stanfield | 156/94 |

*Primary Examiner*—Douglas J. Drummond
*Attorney, Agent, or Firm*—Freilich, Hornbaker, Wasserman, Rosen & Fernandez

[57] ABSTRACT

Apparatus for repairing sprocket holes on strip material, such as motion picture film, with pressure adhesive tape having holes, is provided with guide means for feeding material through a sprocket wheel at a repair station, and an improved means for pressure bonding repair tape on material at the sprocket wheel comprised of a sponge rubber pressure roller. Dual tracks and sprocket wheels are provided for use of the apparatus with material of different gauges.

1 Claim, 2 Drawing Figures

PRESSURE ROLLER FOR APPARATUS USEFUL IN REPAIRING SPROCKET HOLES ON STRIP MATERIAL

BACKGROUND OF THE INVENTION

This invention relates to an apparatus for aligning and bonding a preperforated tape to perforated material, such as motion picture film and the like, and more particularly to an improvement in a pressure roller for bonding pressure adhesive tape with perforations over sprocket holes in the film.

In ordinary use, the perforations along motion picture film are engaged by drive sprockets or a shuttle arm used to feed the film through a utilization system. As the film is used again and again for its intended purpose, film tends to tear around the perforations, particularly at the beginning and end of a reel of film. In those, and other cases of damage to the perforations, it is desirable to repair the film by bonding a strip of preperforated tape along the film where damage has occurred, with the perforations of the tape aligned with the sprocket holes of the film.

U.S. Pat. No. 3,959,048 discloses an arrangement for bonding preperforated repair tape to motion picture film with the precision required to align the tape perforations with the film perforations along the length of the tape, but the alignment system is complex, and leaves much to be desired. Improvements over that arrangement are disclosed in U.S. Pat. No. 4,026,756. The improvements deal primarily with the problem of aligning the perforations of the repair tape with the perforations of the film along the length of the film.

It has been determined that the asymmetrical sprocket shape disclosed in U.S. Pat. No. 4,026,756 is not required for synchronization, and may itself cause damage to the film since flat sides are provided on the sprocket to force alignment of perforations in the tape with perforations in the film. Instead, it has been found that symmetrical sprockets of the same configuration as sprockets in the film utilization system will best serve the need for alignment of repair tape without any risk of further damage to the perforations in the film. Alignment of the perforations in the repair tape with perforations in the film will be achieved, even though the film tends to shrink with age and other factors, as mentioned in the prior patents.

What is now recognized is the need to improve transverse alignment of the repair tape to maintain side edges of holes in the repair tape in line with side edges of holes in the film, and more particularly to assure firm bonding of the repair tape on the film along side edges of holes and between holes. In the first of the aforesiad patents, a pressure roller is used having "apertures" or recesses shaped and spaced to receive sprockets on the sprocket wheel, thereby to apply pressure to the adhesive tape all around a sprocket hole. This presented a problem in initial adjustment of the roller during the start of each repair run to assure that the sprockets are aligned with roller apertures. To avoid that problem, the pressure roller in the second one of the aforesaid patents is grooved, instead of apertured, but the repair tape between sprocket holes is then not subjected to pressure for good bonding. The problem is to apply pressure all around each sprocket hole.

The term "film" is used hereinafter to refer to any unrestricted length of material with aligned and evenly spaced perforations to be repaired, and the term "sprocket holes" is used hereinafter to refer to those holes. Motion picture film is, of course, a primary example, but the present invention is not to be construed to be limited to a film for motion pictures. The film may be a strip of material for other purposes as well.

SUMMARY OF THE INVENTION

In accordance with the present invention, a sprocket wheel at the repair station pulls repair tape from a roll on a spindle for bonding onto perforated film fed directly from a supply reel (not shown) through a guide to the sprocket wheel. There a sponge rubber pressure roller on a spring loaded lever presses the film onto the repair tape for pressure bonding. From the repair station, the film passes to a take-up reel (not shown).

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
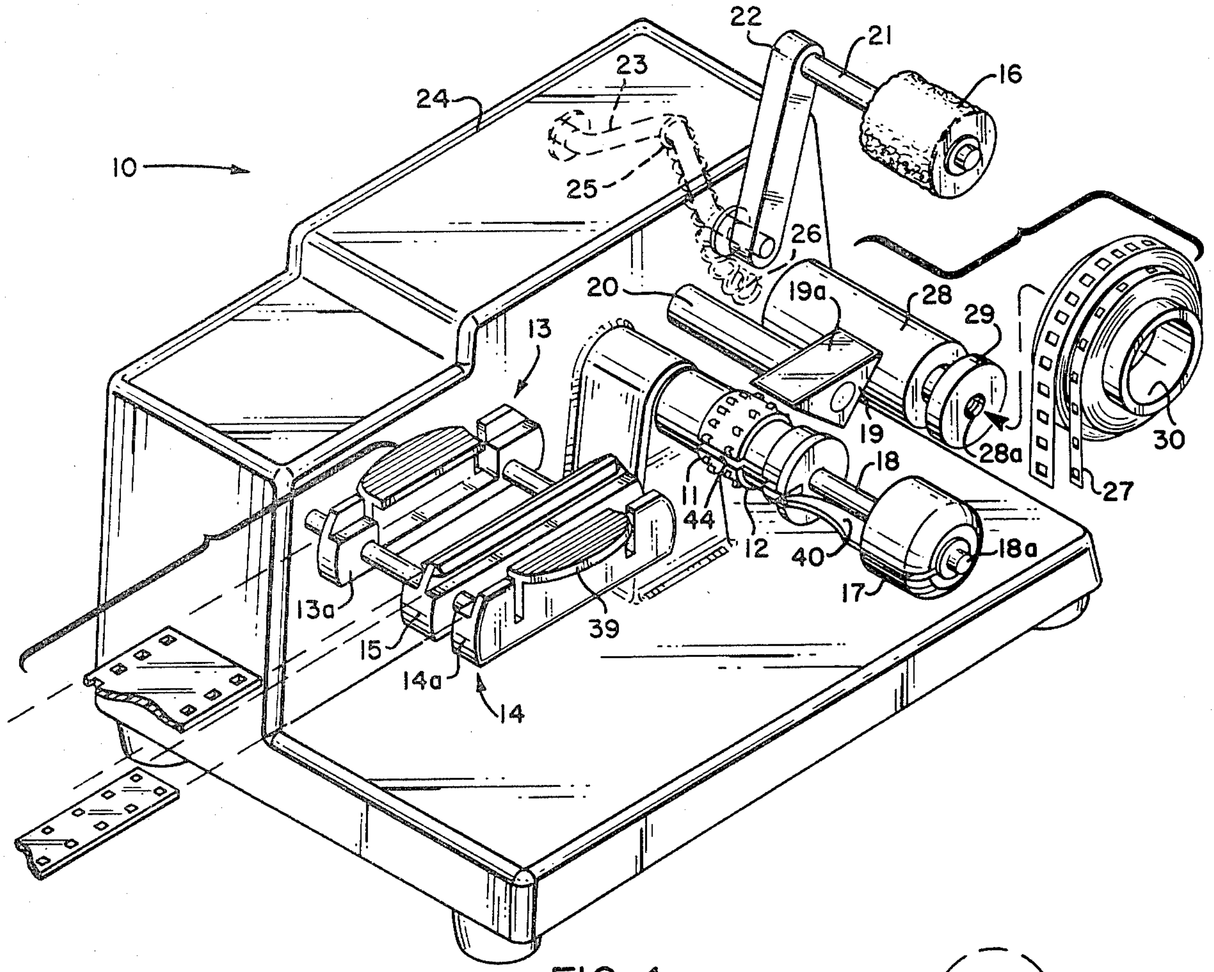
FIG. 1 is a perspective view of apparatus incorporating the present invention.
Figure 2:
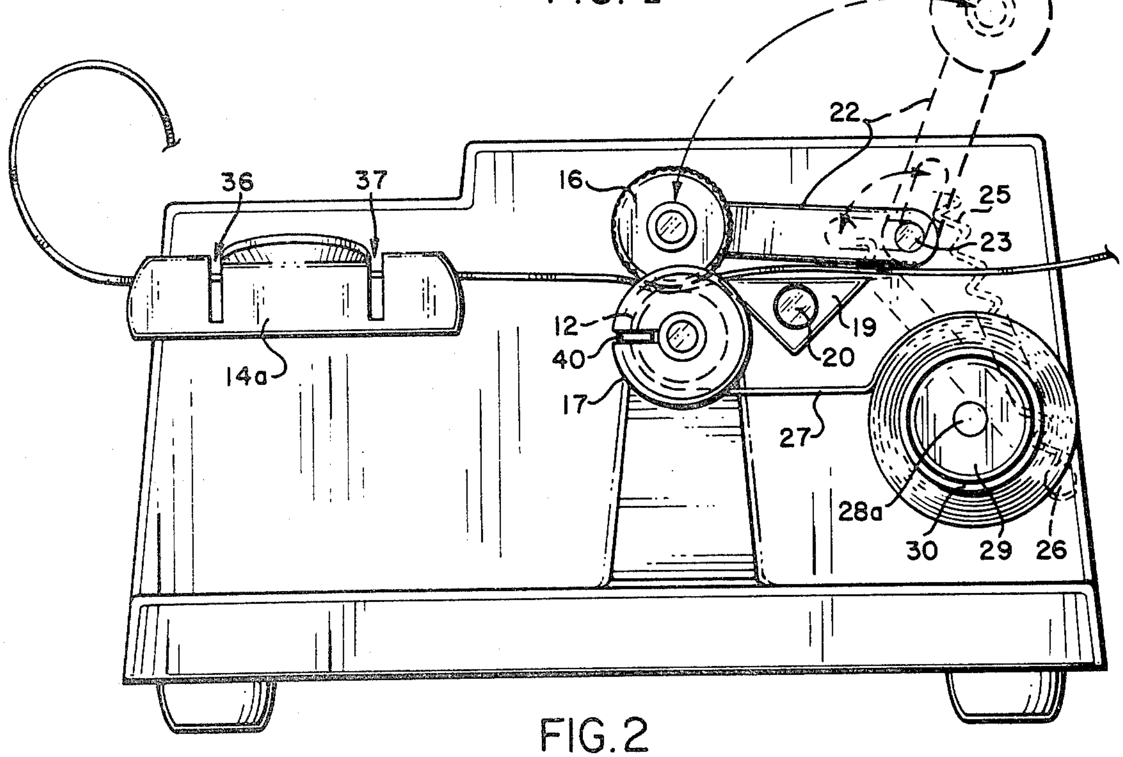
FIG. 2 is a front elevation view of the apparatus in FIG. 1.

Referring now to FIGS. 1 and 2 of the drawings, an apparatus 10 is shown for repairing sprocket holes on film, such as motion picture film. Although many novel features are shown, they are not of my invention, but rather of Daniel E. Rodriguez, as described in a copending application filed concurrently herewith. One feature of this apparatus is the provision of two sprocket wheels 11 and 12, and two elongated guides 13 and 14 for the film being fed into the sprocket wheels, thus allowing for dual use of the apparatus to repair 35 mm film and 16 mm film. The guides are comprised of outside members 13*a* and 14*a*, and a common member 15. These guides are aligned to feed the film into the sprocket wheels in a plane approximately at, or slightly above a horizontal plane tangent with the sprocket wheels, as shown in FIG. 2. A sponge rubber roller 16 presses the film down onto the sprocket wheel with sprocket holes engaging two sprockets. If holes in the film are not initially engaging the sprockets, a slight turn clockwise of a knob 17 will turn the sprocket wheel until sprockets engage holes in the film. Continued turning transports the film through the guide and past the sprocket wheel and pressure roller. Both sprocket wheels are mounted on and attached to the same shaft 18 of the knob 17 so that both will turn together, even though only one will normally be in use at one time. On the downstream (output) side of the sprocket wheels, there is a member 19 mounted on a shaft 20 with a flat surface 19*a* approximately in the same plane as the plane on which film is being fed by the guides, but rotated slightly on the shaft 20 counter clockwise to tilt the edge of the flat surface 19*a* near the sprocket wheels down just enough to allow the sponge pressure roller to press film onto a sufficient section of the sprocket wheels to assure that at least one sprocket engages a film hole at all times as the film is pulled through the repair station, as shown in FIG. 2.

The sponge rubber roller 16 is mounted on a shaft 21 on the end of an arm 22. The arm is in turn attached to a shaft 23 supported between two walls of a hollow support 24. The shaft 23 is bent to form a bit-shaped crankshaft, and a spring 25 is stretched between a point 26 on the inside of a wall of the hollow support 24 and the crankshaft. When the roller is manually raised away from the sprocket wheels, the arm 22 cranks the crankshaft 23 and spring 25 over center thereby holding the sponge rubber roller in the raised position shown in FIG. 1 (and shown in dotted lines in FIG. 2). When the roller is manually returned to a position on the sprocket wheels, the crankshaft and spring again pass over center to hold the roller down on the sprocket wheels as shown in FIG. 2, with pressure on the sprocket wheels determined by the tension of the spring in that position. The sponge rubber of the roller allows the sprockets to "penetrate" into the body of the roller with the sponge rubber material pressing against the sprocket wheel all around the sprocket. This assures a good bond of the repair tape onto the film, including the area between the sprocket holes as well as along the sides of the sprocket holes. The sponge rubber is not damaged by this penetration by the sprockets; it quickly expands and fills out any depression made in the roller by the sprockets as it turns on the shaft 21.

One or two rolls of pressure adhesive repair tape 27 are mounted on a spindle 28 comprised of a thick rubber sleeve over a threaded support shaft 28*a*. By turning a knob 29 on the end of the shaft 28*a* clockwise, the rubber sleeve is compressed on the support shaft enough to provide sufficient drag on a spool 30 for the tapes, so that the tape wrapped over a sprocket wheel is maintained taut as it is pulled off the roll when the sprocket wheel is turned clockwise. The holes in the repair tape are placed over the sprockets of the wheel over about 120°, with the end of the tape about 45° from the top of the wheel ready to engage film when film is placed in position with the pressure roller down. Slowly turning the knob 17 will then bring the repair tape into engagement with the film, and in the process bring sprockets into engagement with sprocket holes in the film ahead of a section to be repaired. Further turning of the knob 17 will cause film and repair tape to be fed together with their holes aligned, and due to the precise alignment of the film by the guide, with the side edges of the holes aligned. Note that a section of film may have all the material between a series of holes missing, but the repair tape having holes engaged by the sprockets will transport film through the repair station.

The term "sponge rubber" is used herein, in a generic sense to refer to resilient, porous (closed cell) material used for the roller, and requires that the material not be a soft rubber. A suitable material that may be used is Buna-N, a nitrile rubber that is commercially available, but any other nitrile rubber (a class of synthetic rubbers) may be used. All that is required is that the resilient material used be formed with closed cells to resemble a sponge, with sufficient density to permit the material, cut or formed into the shape of a roller, to function as a pressure roller while allowing the sprockets to penetrate into the material.

From the foregoing, it can be appreciated that the present invention provides apparatus capable of repairing sprocket holes in selected sections of substantially continuous film with greater assurance of bonding repair tape between perforations in the film than heretofore possible, and with greater facility in placing a pressure roller over the film.

Although a particular embodiment of the invention has been described and illustrated herein, it is recognized that modifications and equivalents may readily occur to those skilled in this art. Consequently, it is intended that the claims be interpreted to cover such modifications and equivalents.

What is claimed is:

1. In apparatus for repairing sprocket holes on a selected section of film by bonding a pressure adhesive repair tape along the length of the film over the sprocket holes, said tape having matching sprocket holes, and said apparatus having a repair station comprised of a wheel on a shaft extending from a support wall, said wheel having sprockets spaced for the sprocket holes of said film, and a pressure roller mounted on a second shaft for pressing film onto the adhesive side of said repair tape for bonding on said film as said sprocket wheel is rotated, an improvement on said pressure roller comprising a cylindrically shaped body of a mass of resilient material formed with a closed cell construction, said body having a diameter of at least the diameter of said wheel and a thickness of resilient material equal to about the difference in diameter of said second shaft and said body, said thickness being substantially greater than the height of said sprockets on said wheel, thereby to assure full and even pressure on said film close in and around each sprocket passing under said pressure roller.

* * * * *

UNITED STATES PATENT AND TRADEMARK OFFICE
CERTIFICATE OF CORRECTION

PATENT NO. : 4,249,985

DATED : February 10, 1981

INVENTOR(S) : James S. Stanfield

It is certified that error appears in the above-identified patent and that said Letters Patent are hereby corrected as shown below:

Column 4, lines 40 and 41 after "having" delete - - a diameter of at least the diameter of said wheel and - - lines 42 and 43 delete "equal to about the difference in diameter of said second shaft and" and substitute - - sufficient for said sprockets to penetrate - - line 43, after "body," delete - - said thickness being substantially greater than the height of said sprockets on said wheel, - -

Signed and Sealed this

*Nineteenth* Day of *May 1981*

[SEAL]

*Attest:*

RENE D. TEGTMEYER

*Attesting Officer* *Acting Commissioner of Patents and Trademarks*